Oct. 28, 1969  L. C. BEARER  3,475,245
METHOD OF FORMING WRAPPED TUBING FROM ORIENTED POLYMER
FILM WHILE MAINTAINING ORIENTATION
Original Filed Oct. 14, 1963

INVENTOR
L.C. BEARER
BY
*Young & Jugg*
ATTORNEYS

United States Patent Office 3,475,245
Patented Oct. 28, 1969

3,475,245
METHOD OF FORMING WRAPPED TUBING FROM ORIENTED POLYMER FILM WHILE MAINTAINING ORIENTATION
Louis C. Bearer, Bartlesville, Okla., assignor to Phillips Petroleum Company, a corporation of Delaware
Original application Oct. 14, 1963, Ser. No. 316,028, now Patent No. 3,333,605, dated Aug. 1, 1967. Divided and this application Apr. 20, 1967, Ser. No. 643,775
Int. Cl. B31c 1/00; B32b 31/08
U.S. Cl. 156—162    8 Claims

ABSTRACT OF THE DISCLOSURE

A method for forming a unitary article which comprises intimately contacting opposing oriented polymeric laminae surfaces having thereon at least one chemical bonding agent curable to chemically bond said opposing surfaces at a temperature sufficiently low to avoid substantial alteration of the orientation of said laminae and maintaining said temperature for a time sufficient to bond said laminae.

---

This is a division of parent application, Ser. No. 316,028 filed Oct. 14, 1963, now Patent 3,333,605.

This invention relates to a method for forming solid members from oriented polymer film while maintaining orientation. In another aspect it relates to a unitary tubing of high tensile strength formed from oriented polymer film.

It has been found that many resinous organic polymers can be given improved properties by orientation. This can be accomplished by stretching a thin section of the polymeric material in the direction in which orientation is desired. Often the material is oriented in two directions at right angles, thus orienting the material biaxially. A primary reason for orientation is to improve tensile strength.

Attempts have been made to form relatively thick sections of oriented polymer by heat bonding together previously oriented thin sections. Although products have been made by this method having properties superior to unoriented sections, it has not been possible to take full advantage of the properties of the oriented material since when the thin sections are heated sufficiently to cause them to fuse to form the thick section, some relaxation and a subsequent reduction in orientation has occurred.

An object of my invention is to produce relatively thick members having improved properties, from thin sections of organic polymers.

Another object of my invention is to form solid members from layers or oriented polymeric material while maintaining orientation.

Another object of my invention is to form polymer tubing having superior qualities.

Other aspects, objects, and the advantages of my invention are apparent in the written description, the drawing and the claims.

According to my invention, unitary members are formed from relatively thin sections of oriented polymer by forming from oriented film a preform having substantially the desired shape and dimensions of the finished member, including employing a novel bonding agent or heat bond promoting agent uniting the layers, and heating the preform to a temperature sufficient to cure the agent or heat bond the polymer in the presence of the promoting agent and produce a preform of superior tensile strength, while not high enough to cause significant loss of orientation of the polymer, and permitting the member to cool without relaxation.

Further according to this invention there is produced a tubular member having high tensile strength which is composed of a number of layers of oriented polymer film with a bonding agent or heat bond promoting agent uniting each of the layers, the agent being a selected organic peroxide which comprises from 0.1 to 10 weight percent of the fabricated member.

My invention is applicable to normally crystalline polymers and copolymers made from 1-olefins containing up to 6 carbon atoms. Such polymers include polymers of ethylene, butylene, propylene, 4-methyl-1-butene and copolymers such as ethylene-butene copolymers. Likewise, blends of such polymers, visbroken polymers, or blends of visbroken polymers can be used. Other thermoplastic polymeric materials which can be oriented by stretching and subsequently coalesced by heating also can be used, such as polystyrene and polystyrene-containing polymers, polyamides, polyvinyl chloride, polyvinyl acetate, cellulosic resins, and the like.

My invention is applicable to the use of films which are oriented by molecular orientation or crystalline orientation, typically biaxially or uniaxially oriented films. The temperature to which the preform is heated is one which is high enough to effect the desired curing or promote bonding between the layers of film while not so high as to cause significant loss in the tensile strength of the oriented film.

Among the novel bonding agents which may be employed in the present invention are the organic peroxides. Thus in addition to the diacyl peroxides, including benzoyl peroxide and lauroyl peroxide, which are highly effective as bonding agents, the following materials may also be used: substances, such as oxygen which react with organic materials to form organic peroxides; dialkyl peroxides such as diethyl peroxide, ditertiary butyl peroxide, diisopropyl peroxide; hydroperoxides such as hydroxymethyl hydroperoxide, tertiary butyl hydroperoxide, ethyl hydroperoxide etc.; peracids, such as acetoperacid, benzoperacid, succinic monoperacid, phthalic peracid, trimethylacetoperacid; peresters, exemplified by ethyl percamphorate, or esters of perbenzoic acid such as ethyl perbenzoate or teritary butyl perbenzoate, compounds containing an

grouping, particularly the organic N-chloro derivatives of amines or amides such as chloramine T, dichloramine T, or chloramine B (sodium-N-chlorobenzene-sulfonamide). Especially useful among these are di-benzoyl peroxide, dicumyl peroxide, and di-tertiary-butyl peroxide.

Addition of the peroxide to the polymer film can be accomplished in several ways: by coating with a brush; by a constantly rewetted contact roller; or by immersion of the film in a solution of the agent maintained below its decomposition temperature.

The agent is preferably applied to the polymer film while dispersed in an organic solvent. The peroxide generally comprises about 3 to 20 weight percent of the hydrocarbon diluent, preferably in the range 5 to 10 percent. Preferably the solvent should be sufficiently volatile that it can be selectively vaporized from the peroxide.

Among the hydrocarbon diluents of suitable volatility for the purposes of this invention are benzene, toluene xylenes, methylhexanes, Tetralin, Decalin, dioxane and dimethyl formamide.

The upper limit on the amount of peroxide is dictated by various features, principally using no more than is necessary to achieve a sound bond.

Also, excess cross linking would produce greater elongation under pull, resulting in more rubbery properties. The lower limit would be dictated by the need to avoid delamination, and also to keep the curing time within reasonable limits. Thus, the amount of peroxide should comprise from 0.1 to 10 weight percent of the fabricated member.

In the drawing, FIGURE 1 is a schematic view of apparatus for applying bonding agent to polymer sheet or film, and rolling a tube therefrom;

Figure 1:
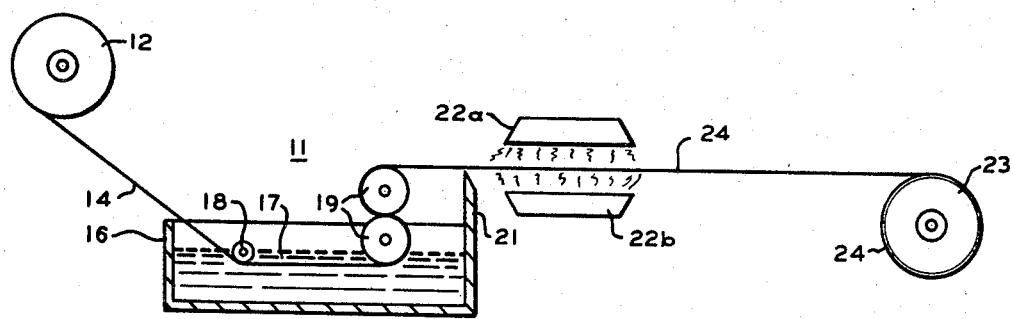

Referring now to FIGURE 1 of the drawing, there is illustrated apparatus 11 for the treatment of polymer film, which may be a polyolefin, homopolymer or copolymer to be employed in preparing the tubular member of this invention. A roll 12 of polymer film material 14 is disposed at one end of apparatus 11. The film 14 is withdrawn from the roll 12 and passes into dip pan 16 containing a solution 17 of organic peroxide in an organic diluent, maintained below the particular peroxide decomposition temperature, then beneath a roller 18 also immersed in said solution so that the film is soaked in the solution.

The coated film is withdrawn from the solution 17, and passes between a pair of squeeze rollers 19, where the amount of applied solution is controlled by the setting of the rolls. The bottom side of the coated film is drawn over a scraper 21 so as to remove any adhering superficial bonding agent from that one side. The treated film is passed under a radiant type heater 22 to allow substantially all of any remaining volatile solvent to be removed from the treated material before it comes into contact with the mandrel 23 and becomes a part of the tube proper. Care must be taken to minimize curing or hardening of the bonding agent before the film is wrapped onto the mandrel.

The treated sheet 24 is rolled onto mandrel 23, preferably a solid mandrel. The surface of the mandrel is initially provided with a coating of lubricant or other parting medium to enable the ultimately formed tubular member to be separated readily therefrom. As illustrated, the coated sheet 24 is passed under radiant heaters 22a and b and wrapped about the mandrel. In rolling the treated sheet on the mandrel, as much tension and pressure should be applied as is necessary to preclude air entrapment or poor surface contact. A tension of about one pound per linear inch has proved satisfactory for one mil of polyolefin film. In addition, rollers (not shown) may be applied about the mandrel 23 to compress the applied layers of film thereon, if desired.

Figure 2:
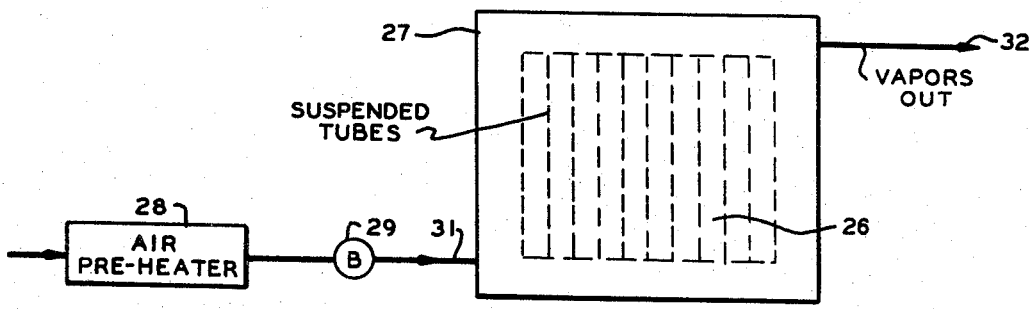
FIGURE 2 is a schematic view of an apparatus for curing the tubing preform.

As illustrated schematically in FIGURE 2, the preformed tubes are disposed in racks 26 in an oven 27, through which heated air is forced to cure the bonding agent. Air is drawn from a source (not shown), passed through preheater 28 and blower 29, entering oven 27 via conduit 31. Air and any solvent vapors escape through stack 32. The oven temperature is carefully controlled to attain the optimum degree of bonding for the particular bonding agent and polymer film employed. This will unite the laminations of film into a homogenous high density bonded preform. A preferred oven temperature range is from 250 to 270° F. The heating period in said oven will range between 1 minute and 1 hour, dependent on the particular bonding agent and the degree of preheating by radiant heaters 22a and b.

Figure 3:
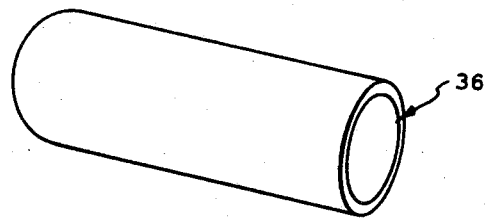
FIGURE 3 is a perspective view of the finished tube.

Thereafter, the mandrel may be removed by withdrawing same from the cured tube. Except for sanding or machining to lengths suitable for a particular purpose, such as shot gun shell casings, the fully cured laminated tubular member 36, shown in FIGURE 3, is ready for use.

EXAMPLE

In an example, according to my invention, a mandrel is typically made from stainless steel tubing, the tubes being about 1 foot long, and having an outside diameter of 0.750 inch. In each run 25 to 30 wraps of 0.7 mil film, fabricated from a blend of 40 weight percent of a particle-form copolymer of ethylene and butylene, having a density in the range of 0.939 to 0.943 and with a high load melt index (ASTM method D1238–52T, Condition F) in the range of 1 to 3, and 60 percent of a solution copolymer of ethylene and butylene, having a density of 0.95 and a melt index of 6.5, were wrapped on the mandrel and the ends clamped to prevent axial movement. The film had an average tensile strength of 21,000 p.s.i. in the transverse direction. As wrapped on the mandrel, the transverse direction of the film was in the axial direction of the tubing.

Prior to wrapping, one side of the film was brushed with a heat bond promoting agent, specifically a 10 weight percent solution of di-benzoyl peroxide in benzene. Other specimens of film were brushed with a 10 weight percent solution of dicumyl peroxide in benzene. All specimens were cured in a forced air oven for one hour at a temperature of 260 to 262° F. for periods ranging from fifteen minutes to one hour. The specimens were cooled in water. Tensile specimens ¼ inch wide and 2 inches long were then pulled on a testing machine. The breaking stress on the specimens ranged from 23,000 to 9,000 p.s.i. in the longitudinal or axial direction of the tubes.

Other runs were to produce tubing which were identical in all respects except that the use of bonding agent or heat bond promoting agent was omitted, and higher temperatures in the range 266 to 268° F. were employed to insure an equivalent degree of coalescence of the adjacent film layers to produce a unitary member. Similar tensile specimens were pulled on a testing machine, the tensile strengths ranging from 17,000 to 4,400 p.s.i. in the tube longitudinal or axial direction.

For the same degree of coalescence, i.e., adhesion between film layers it is readily apparent that the bonding agent or heat bond promoting agent gives a markedly superior tensile strength to the plastic tubing in the axial direction at a lower curing temperature than is obtained solely by heating.

In the fabrication of tubing and other shapes by the process of my invention, the percent decrease in tensile strength is a function of the amount of relaxation permitted to occur. Relaxation relates to the tendency for the film to change dimension when reheated. The relaxation varies with tightness and uniformity of the wraps, the ability of the clamping means to restrict movement, and the curing temperature. If the film is wrapped with differing lengths, has nonuniform gauge, or is wrapped loosely, the film when heated shrinks until restricted by the mandrel, thus resulting in tensile strength reduction.

Increase of curing temperature, if carried too far, can result in complete melting of the tubing, and/or significant loss in strength, appearance and uniformity from loss of orientation. To achieve minimum tensile strength losses, curing temperature should be only high enough to obtain the desired film layer bonding or coalescing, wrapping should be tight, the film should be thin and as uniform as possible, an optimum curing time being selected which will allow the sample to reach uniform temperature to obtain film layer bonding, and the part should be secured to eliminate substantially all shrink back of the film.

With the material of the above example, curing temperatures in the range of 260° F. to 262° F. are preferred, and the processing time should be sufficient to permit all of the film to attain curing temperature.

The curing time can be shortened by preheating the mandrel and the film as it is unrolled and wrapped. Such preheat can, for example, be by radiant means or hot air. The mandrel heating is to a temperature below the point at which polymer coalescence begins. This depends on the speed of wrapping since shrinkage is a function of time. Preferably a temperature of preheat in the range of 10 to 15° F. below curing temperature can be utilized advantageously.

A particularly useful application of tubes made according to my invention is in the production of shotgun shell cases. When a shot shell is fired, the expanding gases push the wadding against the shot, which is held in by a shot-retaining disc. Since the shot is round, it behaves somewhat like a fluid and is forced against the wall of the shell. If the wall is soft, the shot imbeds in it slightly and tends to pull the shell with them. Portions of the shell can thus be torn away as a result.

When the tubing is made by wrapping and heat-curing oriented film, the strengths of the tubing in the axial and hoop directions are determined by the biaxial strength characteristics of the film. With the film wrapped so that the highest tubing strength is in the axial direction, resistance of the shell to the tearing away action of the shot is improved.

Another important characteristic of oriented film is that surface hardness is somewhat dependent on degree of orientation. Harder surfaces resist the imbedding of the shot and thereby reduce the tendency of the shot to tear away the shell. Therefore, the high-oriented hard surface should be retained as an inside wall.

It is within the scope of this invention to not immediately proceed from the film coating and solvent evaporating steps to the film wrapping step in certain applications. For example, it may be desired to only impregnate a polymer film with an organic peroxide which is to serve as a bonding agent at a later time. The coating step would be identical. However, heating of the coated film is to a temperature sufficient only to evaporate substantially all of said solvent but insufficient to cause curing of the bonding agent at this time.

I claim:

1. A method for forming a unitary article which comprises intimately contacting opposing oriented thermoplastic polymeric laminae surfaces having thereon at least one chemical bonding agent curable to chemically bond said opposing surfaces, and heating said opposing surfaces at a temperature sufficiently low to avoid substantial alteration of the orientation of said laminae but sufficiently high to cure said agent and form said bond, and maintaining said temperature for a time sufficient to bond said laminae.

2. The method of claim 1 wherein said laminae are selected from polymers of at least one 1-olefin having from 2 to about 6 carbon atoms and said chemical bonding agent is an organic peroxide.

3. The method of claim 2 wherein said chemical bonding agent is curable at a temperature of from about 250–270° F.

4. The method of claim 2 wherein said organic peroxide is selected from dibenzoyl peroxide, dicumyl peroxide, and di-tertiary-butyl peroxide.

5. The method of claim 1 wherein said polymeric laminae comprises a biaxially oriented film, and said article is formed by wrapping said film to form a multi-layer tubular preform of substantially the desired diameter and thickness and heating said preform to a temperature sufficient to cure said bonding agent yet insufficient to cause substantial alteration of the orientation of said laminae.

6. A method according to claim 1 wherein said organic peroxide is applied to said laminae dispersed in a hydrocarbon solvent which is sufficiently volatile that it can be selectively vaporized from the peroxide but insufficient to cause curing of the bonding agent, the amount of peroxide applied to said laminae being from 0.1 to 10 weight percent based on the article, vaporizing said hydrocarbon solvent, leaving organic peroxide on said laminae, and heating said laminae at a temperature in the range of 250–270° F.

7. A method according to claim 2 for forming a unitary tubing of oriented polymer which comprises:
 (a) coating biaxially-oriented olefin polymer film with an organic peroxide dispersed in an organic solvent selected from benzene, toluene, xylenes, methylhexanes, Tetralin, Decalin, dioxane, and dimethyl formamide;
 (b) wrapping the coated film on a cylindrical form to produce a multilayer tubing preform of substantially the desired diameter and thickness of said tubing; and
 (c) heating said tubing preform to a temperature in the range of 250 to 270° F. for a period of time ranging from 15 minutes to 1 hour, sufficient to cure said agent to produce a tubing preform of superior strength.

8. A method according to claim 7 wherein said olefin polymer is a polymer of ethylene and said organic peroxide is selected from di-benzoyl peroxide, dicumyl peroxide, and di-tertiary-butyl peroxide.

References Cited
UNITED STATES PATENTS

| | | | |
|---|---|---|---|
| 2,801,945 | 8/1957 | Rodgers et al. | 138—141 |
| 3,325,325 | 6/1967 | Ward | 156—86 XR |
| 3,189,052 | 6/1965 | Devaney | 156—184 XR |
| 3,099,293 | 7/1963 | Lakritz et al. | 138—141 |

HAROLD ANSHER, Primary Examiner

PHILIP DIER, Assistant Examiner

U.S. Cl. X.R.

117—138.8; 156—164, 326; 161—188, 247